(12) United States Patent
Van Druten et al.

(10) Patent No.: US 8,146,451 B2
(45) Date of Patent: Apr. 3, 2012

(54) DRIVE FOR A VEHICLE, IN PARTICULAR A LORRY

(75) Inventors: Marie Roell Van Druten, Eindhoven (NL); Gerard Bas Vroemen, Eindhoven (NL); Anita Franciscus Alexander Serrarens, Waalre (NL)

(73) Assignee: DTI Group B.V., Eindhoven (NL)

( * ) Notice: Subject to any disclaimer, the term of this patent is extended or adjusted under 35 U.S.C. 154(b) by 1171 days.

(21) Appl. No.: 11/973,495

(22) Filed: Oct. 9, 2007

(65) Prior Publication Data

US 2008/0090691 A1    Apr. 17, 2008

(30) Foreign Application Priority Data

Apr. 8, 2005  (NL) .................................... 1028718
Apr. 10, 2006  (WO) ................ PCT/NL2006/000186

(51) Int. Cl.
*F16H 3/08*    (2006.01)
(52) U.S. Cl. ........................................... 74/330; 74/331
(58) Field of Classification Search ................ 74/329, 74/330
See application file for complete search history.

(56) References Cited

U.S. PATENT DOCUMENTS

| | | | | |
|---|---|---|---|---|
| 6,766,705 B1 * | 7/2004 | Hall, III | ......................... | 74/331 |
| 6,895,832 B2 * | 5/2005 | Ishihara et al. | ................. | 74/325 |
| 2003/0148847 A1 | 8/2003 | Kawamoto et al. | | |

FOREIGN PATENT DOCUMENTS

| | | |
|---|---|---|
| DE | 10 2004 006732 | 9/2005 |
| EP | 1 262 684 | 12/2002 |
| WO | WO 99/15810 | 4/1999 |
| WO | WO 2004/098937 | 11/2004 |
| WO | WO 2006/107202 | 10/2006 |

* cited by examiner

*Primary Examiner* — Edwin A Young
(74) *Attorney, Agent, or Firm* — Eric Karich (57) ABSTRACT

A drive has a drive source with an outgoing drive shaft, which can be connected via a clutch to a first input of a gear, which is formed by an input shaft. The gear also has an output, which is formed by an output shaft. The gear also has a second input, which is formed by a gear wheel of a first gear wheel pair concentrically present on the input shaft and which can be directly connected via a further clutch to the drive shaft. The drive also has a pre-reduction, which is formed by a planetary gear with three rotation bodies, one of which is connected to the input shaft, one to the drive shaft and one that can be connected via a clutch or brake to the fixed entities.

12 Claims, 7 Drawing Sheets

DRIVE FOR A VEHICLE, IN PARTICULAR A LORRY

BACKGROUND OF THE INVENTION

1. Field of the Invention

The invention relates to a drive for a vehicle, in particular a lorry, comprising a drive source with an outgoing crank shaft, as well as a transmission with a first input that can be connected to the crank shaft and an output that can be connected to the driven wheels of a vehicle, which transmission comprises several gear clutches, as well as several gear wheel transmissions, which can be connected to each other via the gear clutches and to the input and output, which transmission also comprises a further, second input concentric to the first input, and which drive also comprises a first clutch formed by a main clutch, which is present between the crank shaft and the first input of the transmission, a second clutch formed by a further clutch, which is present between the crank shaft and the second input of the transmission, and a third clutch formed by one of the gear clutches, which third clutch is present between the first and second inputs of the transmission.

2. Description of Related Art

A similar drive is disclosed in U.S. Application number 2003/0148847. In this known drive the second clutch can connect the second input via a planetary gear to the crank shaft or via the planetary gear and the third clutch to the first input. With this known drive it is possible to achieve at least a number of changes to another transmission ratio with retention of torque transfer between the drive source and the driven wheels.

SUMMARY OF THE INVENTION

An objective of the invention is to improve the known drive. For this purpose, the drive according to the invention is characterised in that the further clutch can connect the crank shaft directly to the second input and the third clutch can connect the first input directly to the second input of the transmission, whereby the first input is formed by an input shaft and the second input is formed by a gear wheel concentric to the input shaft, which gear wheel is part of one of the gear wheel transmissions. With directly is meant that no further elements are present between the parts to be connected which can interrupt torque transmission between these parts.

An embodiment of the drive according to the invention is characterised in that the further clutch is formed by a synchromesh.

A further embodiment of the drive according to the invention is characterised in that the third clutch is formed by a synchromesh.

Yet a further embodiment of the drive according to the invention is characterised in that the main clutch can connect the crank shaft directly to the first input of the transmission.

An embodiment of the drive according to the invention is characterised in that the drive also comprises a planetary gear with three rotation bodies, of which a first rotation body is connected to the first input of the transmission and via the main clutch to the crank shaft, a second rotation body is connected to the crank shaft and via the further clutch to the second input of the transmission, and a third rotation body can be connected via a clutch or brake to the fixed entities.

Preferably, the first rotation body is formed by an annulus, the second rotation body by a planet carrier, and the third rotation body by a sun wheel.

A further embodiment of the drive according to the invention is characterised in that the transmission can be changed between several transmission ratios with the same mutual differences and in that with a third rotation body connected to the fixed entities, the transmission ratio of the planetary gear is such that the planetary gear forms a pre-reduction, which reduces the total transmission of the drive by twice the difference between the successive transmission ratios of the transmission. This allows changes to be made between transmission ratios without interruption of the drive line between drive source and driven wheels.

Preferably, a first and second gear wheel transmission of the gear wheel transmissions of the transmission can be selectively connected by a first of the gear clutches to the first input and to a third, fourth and fifth gear wheel transmission, of which a third gear wheel transmission can be connected by a second gear clutch to an intermediate shaft, and the fourth and fifth gear wheel transmission can be selectively connected by a third gear clutch to the intermediate shaft, which second gear lever clutch can connect the intermediate shaft to the first gear clutch instead of to the third gear wheel transmission, and which intermediate shaft can be directly connected via a fourth gear clutch to the output or via a further planetary gear that belongs to the transmission, in which the second input is connected to the first gear wheel transmission.

A still further embodiment of the drive according to the invention is characterised in that the second gear clutch can connect the intermediate shaft to a part of the first gear clutch that is connected to the input. In this case the transmission ratio of the third gear wheel transmission is preferably equal to that of the fourth gear wheel transmission in the previous embodiment and that of the fourth gear wheel transmission is preferably equal to that of the third gear wheel transmission of the previous embodiment. This allows more changes to be made between transmission ratios without interruption of the drive line between drive source and driven wheels.

The invention also relates to a method for shifting the drive according to the invention. Regarding this method, the invention is characterised in that when a first transmission ratio of the transmission is changed to a second transmission ratio, the main clutch is slipped so that the torque transfer of the drive source to the output occurs via the further clutch and a path is created in the transmission by putting the gear clutches into a position so that the transmission ratio of the transmission is higher than the second transmission ratio.

Another embodiment of the method according to the invention is characterised in that a change is made between two different paths with equal transmission ratios.

BRIEF DESCRIPTION OF THE DRAWINGS

The invention will be elucidated more fully below on the basis of drawings in which embodiments of the drive according to the invention are shown. In these drawings.

DETAILED DESCRIPTION OF THE INVENTION

Figure 1:
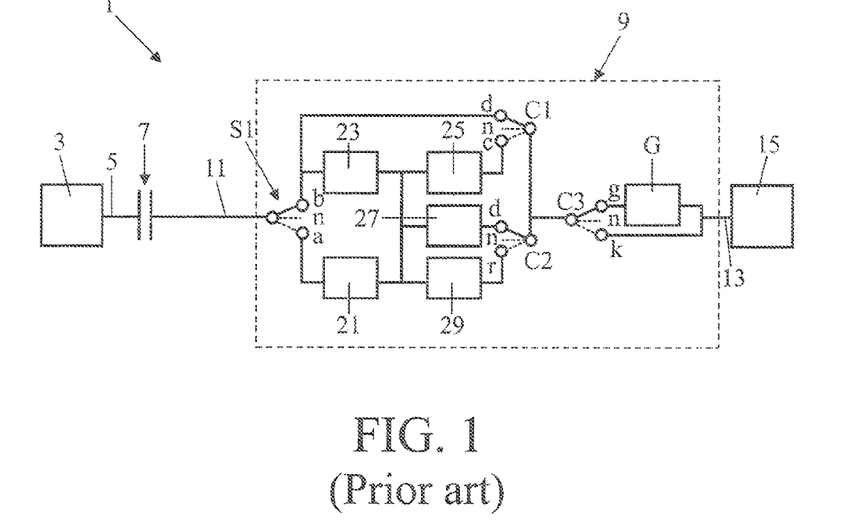
FIGS. 1 and 2 show a diagrammatic and constructive representation respectively of the known drive.
Figure 2:
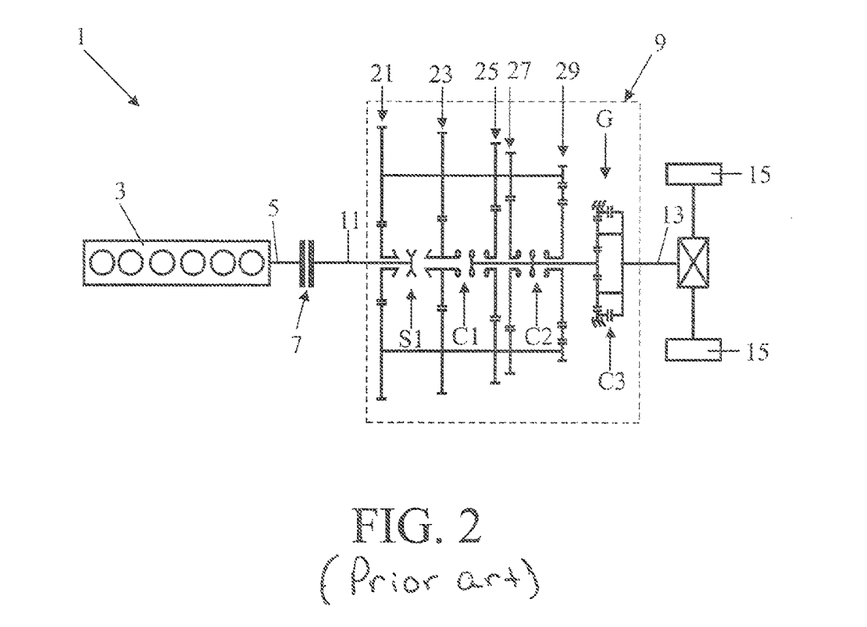

FIGS. 1 and 2 show a diagrammatic and constructive representation respectively of the known drive. This drive 1 has a drive source 3 with an outgoing crank shaft 5, which can be connected via a first clutch formed by a main clutch 7 to a first input of a transmission 9, which is formed by an input shaft 11. The transmission 9 also has an output, which is formed by an output shaft 13 that can be connected to the driven wheels 15.

The transmission 9 has several gear wheel transmissions 21-29 connected to each other and a planetary gear G. Each gear wheel transmission has a central gear wheel and two gear wheels interlocking with it, which are on two further shafts that are parallel to the central shaft. The transmission 9 also has several gear clutches S1, C1, C2 and C3, which can connect a shaft or gear wheel to one of two further shafts or gear wheels (positions a, b, p, c, d, r, g, k) or to neither (neutral position n). Gear clutch S1 is a synchromesh clutch and gear clutches C1, C2 and C3 are claw clutches.

Putting the gear clutches into different positions can provide 12 different ratios and a reverse ratio.

Figure 3:
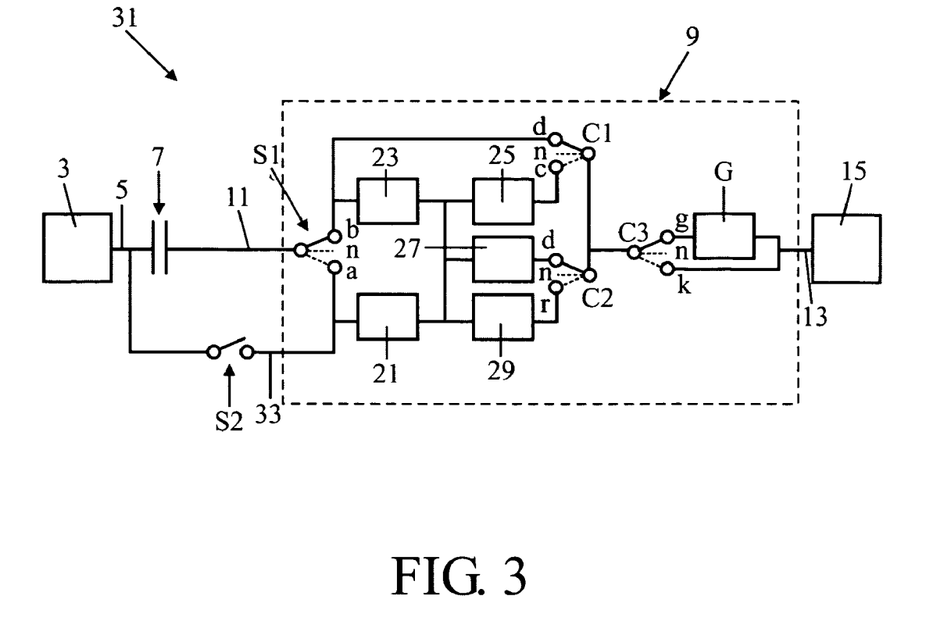
FIGS. 3 and 4 show a diagrammatic and constructive representation respectively of a first embodiment of the drive according to the invention.
Figure 4:
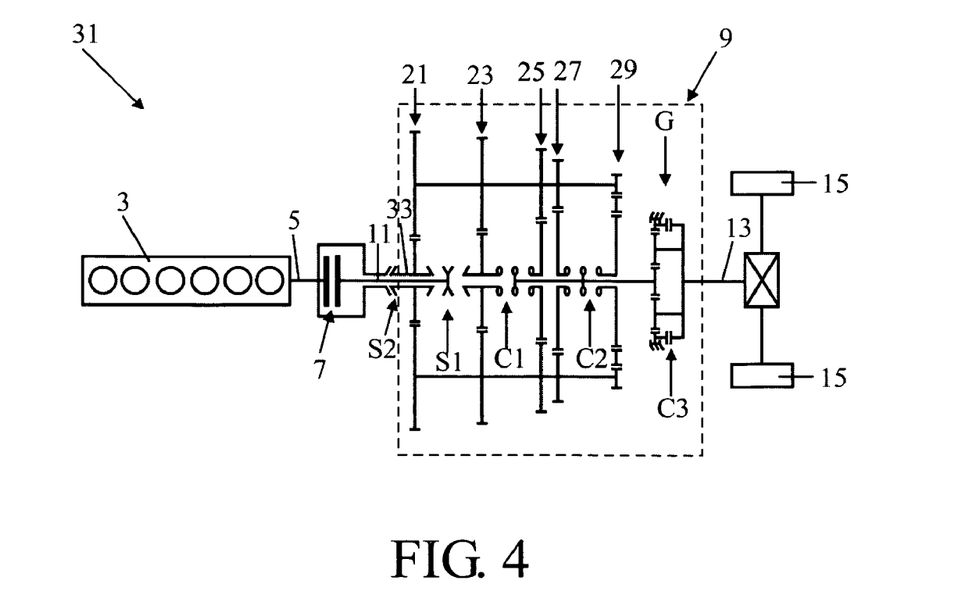

FIGS. 3 and 4 show a diagrammatic and constructive representation respectively of a first embodiment of the drive according to the invention. In this drive 31, the transmission 9 in addition to the stated first input has a further second input 33, which is formed by a gear wheel concentric to the input shaft 11, which is part of the gear wheel transmission 21. This drive 31 also has a second clutch formed by a further clutch S2, which can directly connect the crank shaft 5 to the second input 33. Further clutch S2 is also a synchromesh clutch. Gear clutch S1 forms a third clutch of the drive.

The main clutch 7 is preferably a wet plate clutch, which when not engaged is closed by a spring. A torsion spring is preferably present between the crank shaft 5 and the main clutch 7. The lamellae of the main clutch 7 act here as a second reduction in addition to the flywheel of the drive source that forms the first reduction so that a Dual Mass Flywheel is present.

The first six transmissions are obtained with gear clutch C3 in position g and the last six transmissions with C3 in position k. The first transmission is obtained by closing the further clutch S2 and putting gear clutch C2 in position d. The other gear clutches are open or in the neutral position. The second transmission is obtained by closing the main clutch, putting gear clutch S1 in position b and gear clutch C2 in position d. The third transmission is obtained by closing S2 and putting C1 in position c. The fourth transmission is obtained by closing the main clutch, putting S1 in position b and C1 in position c. The fifth transmission is obtained by closing S2 and putting C1 in position p. And the sixth transmission is obtained by closing the main clutch, putting S1 in position b and C1 in position p. The seventh to twelfth transmissions are obtained with C3 in position k. The differences between the successive transmissions are all equal.

The further clutch S2 can be used to change from the first to the second transmission, from the third to the fourth transmission, from the fifth to the sixth transmission (C3 in position g) and from the seventh to the eighth, ninth to the tenth and eleventh to the twelfth transmission without interrupting the drive of the drive source to the wheels.

Figure 5:
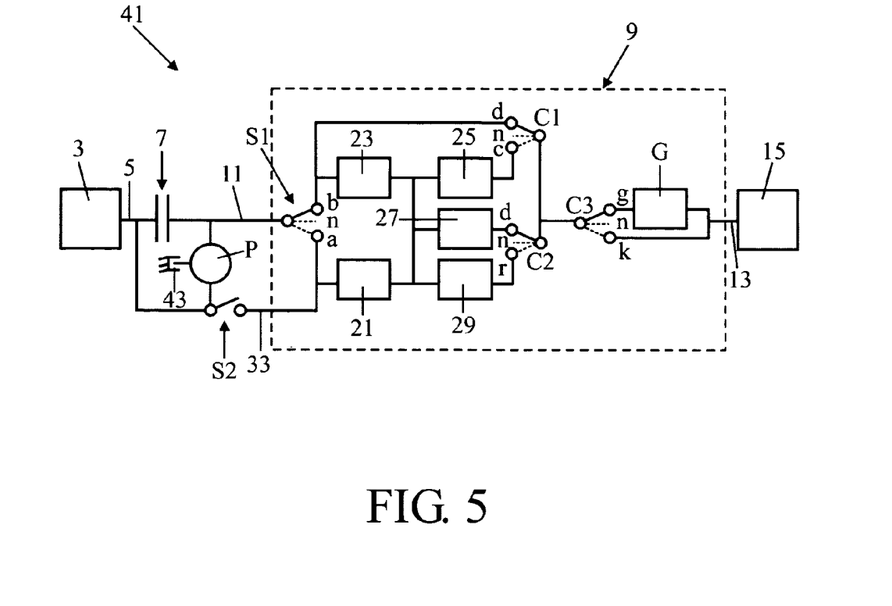
FIGS. 5 and 6 show a diagrammatic and constructive representation respectively of a second embodiment of the drive according to the invention.
Figure 6:
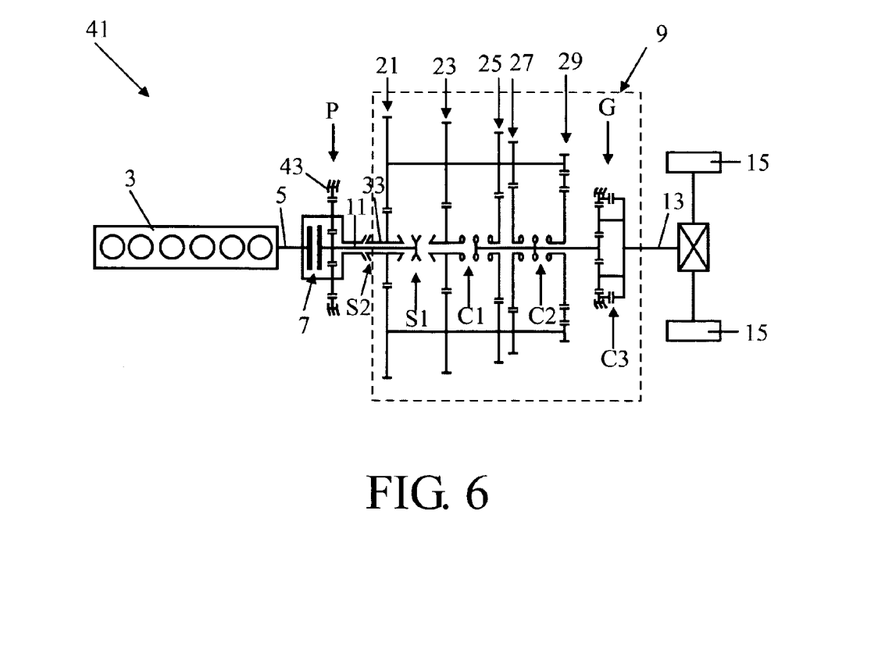

FIGS. 5 and 6 show a diagrammatic and constructive representation respectively of a second embodiment of the drive according to the invention. This drive 41 also has a planetary gear P between the crank shaft 5 and the input shaft 11. The planetary gear P has three rotation bodies, of which a first rotation body, formed by an annulus, is connected to the first input of the transmission, a second rotation body, formed by a planet carrier, is connected to the crank shaft 5, and a third rotation body, formed by a sun wheel, can be connected via a clutch (synchromesh) or brake 43 to the fixed entities. The brake/clutch 43 is preferably also a wet plate clutch. An extra reduction can be obtained with this planetary gear P which is equal to twice the difference between two successive transmission ratios. This means that with S1 in position b, a zero transmission 0 (=2-2), a further second transmission 2* (=4-2) and a further fourth transmission 4* (=6-2) can be obtained and with S1 in position a, a transmission −1 (=1-2), a further first transmission 1* (=3-2) and a further third transmission 3* (=5-2) are obtained.

The zero transmission is obtained by opening the main clutch and further clutch, putting S1 in position b and C2 in position d (C3 in position g). The further second transmission is obtained by opening the main clutch and further clutch, putting S1 in position b and C1 in position c (C3 in position g).

This means the following transmission changes can be obtained with S1 in position b without interrupting the drive of the drive source to the wheels:

C1 in position n, C2 closed: 0-1-2,
C1 in position c, C2 open: 2*-3-4, and
C1 in position b, C2 open: 4*-5-6.

With S1 in position a, the following transmission changes can be obtained without interrupting the drive of the drive source to the wheels:

C1 in position n, C2 closed: −1 to 1,
C1 in position c, C2 open: 1* to 3, and
C1 in position b, C2 open: 3* to 5.

The following gear changes can be obtained if a change is made between a gear over the planetary gear P (marked with an *) and an equal gear without intervention of the planetary gear P:

0-1-2-2*-3-4-4*-5-6 (ditto for C3 in position k),
−1-1-2-2*-3-4-4*-5-6 (ditto for C3 in position k),
−1-1-1*-3-3*-5-6 (ditto for C3 in position k), and
−1-1-2-2*-3-3*-5-6 (ditto for C3 in position k).

EXAMPLE

Changing from transmission 2 to 2* is possible by opening the main clutch and C2 and reducing the rpm of both further shafts via the brake/clutch 43, after which C1 in position c can be selected synchronously. The engine rpm remains the same in this gear change, so that this gear change can be made quickly and comfortably. Inversely from 2* to 2 is also possible by opening brake/clutch 43 and C1 and increasing the rpm of both further shafts via the main clutch, after which C2 can be selected synchronously.

Figure 7:
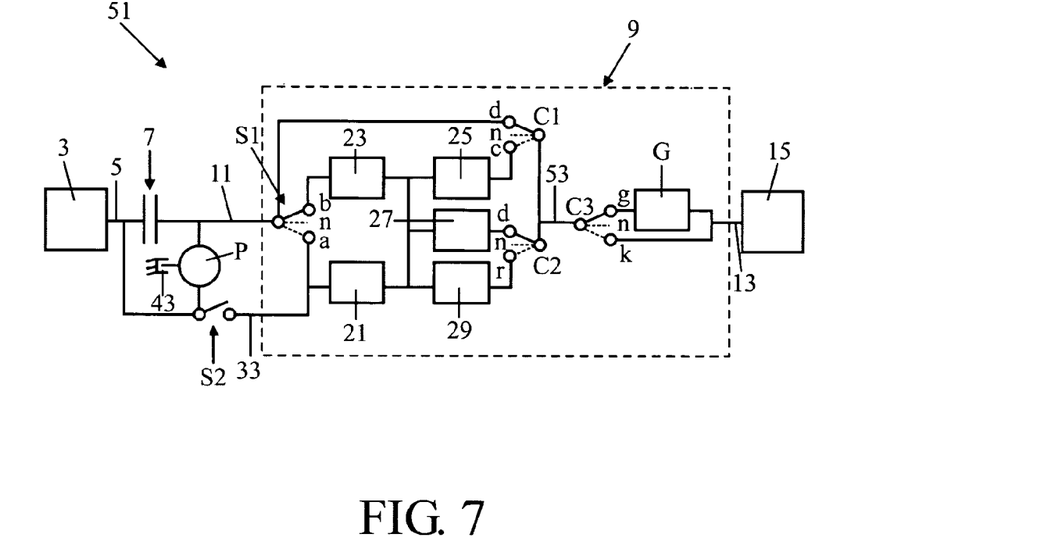
FIGS. 7 and 8 show a diagrammatic and constructive representation respectively of a third embodiment of the drive according to the invention.
Figure 8:
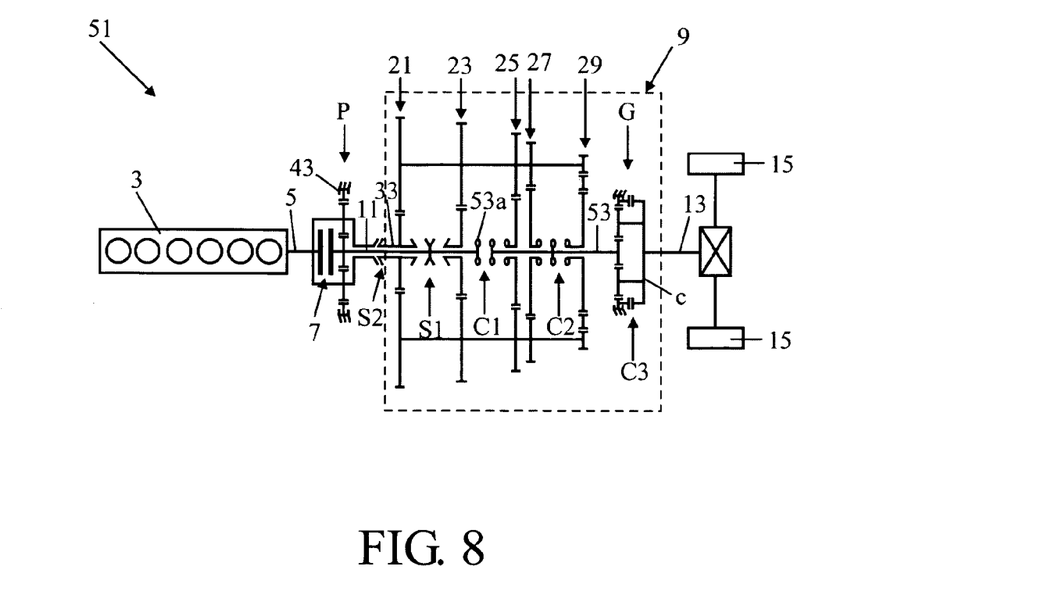

FIGS. 7 and 8 show a diagrammatic and constructive representation respectively of a third embodiment of the drive according to the invention. The transmission is internally altered in this drive 51. The second gear clutch C1 can connect the intermediate shaft 53 to a part of the first gear clutch S1 connected to the input shaft 11. Moreover, the transmission ratio of the third gear wheel transmission is equal to that of the fourth gear wheel transmission in the previous embodiment and that of the fourth gear wheel transmission is equal to that of the third gear wheel transmission of the previous embodiment.

It is here possible to change 2*-3-4*-5-6 without interruption of the drive (five transmissions in a row).

Example 1

From transmission 2* to 3 (via 4) by closing the main clutch, opening the brake/clutch 43 and closing the main clutch further until S2 is synchronous and can be closed. The main clutch can then open again. S1 then goes to position n and C1 to position p.

Example 2

From transmission 3 to 4* (via 6) by closing the main clutch, opening S2 and closing the main clutch further until brake/clutch 43 is synchronous and can be closed. The main clutch can then open again. C2 then goes to position n and S1 to position b.

Example 3

From transmission 4* to 5 (via 6) by closing the main clutch, opening brake/clutch 43 and closing the main clutch further until S2 is synchronous and can be closed. The main clutch can then open again.

Example 4

From transmission 5 to 6 (via 6) by closing the main clutch, opening S2 and closing the main clutch further until the main clutch is closed. S1 can then go to position n.

Figure 9:
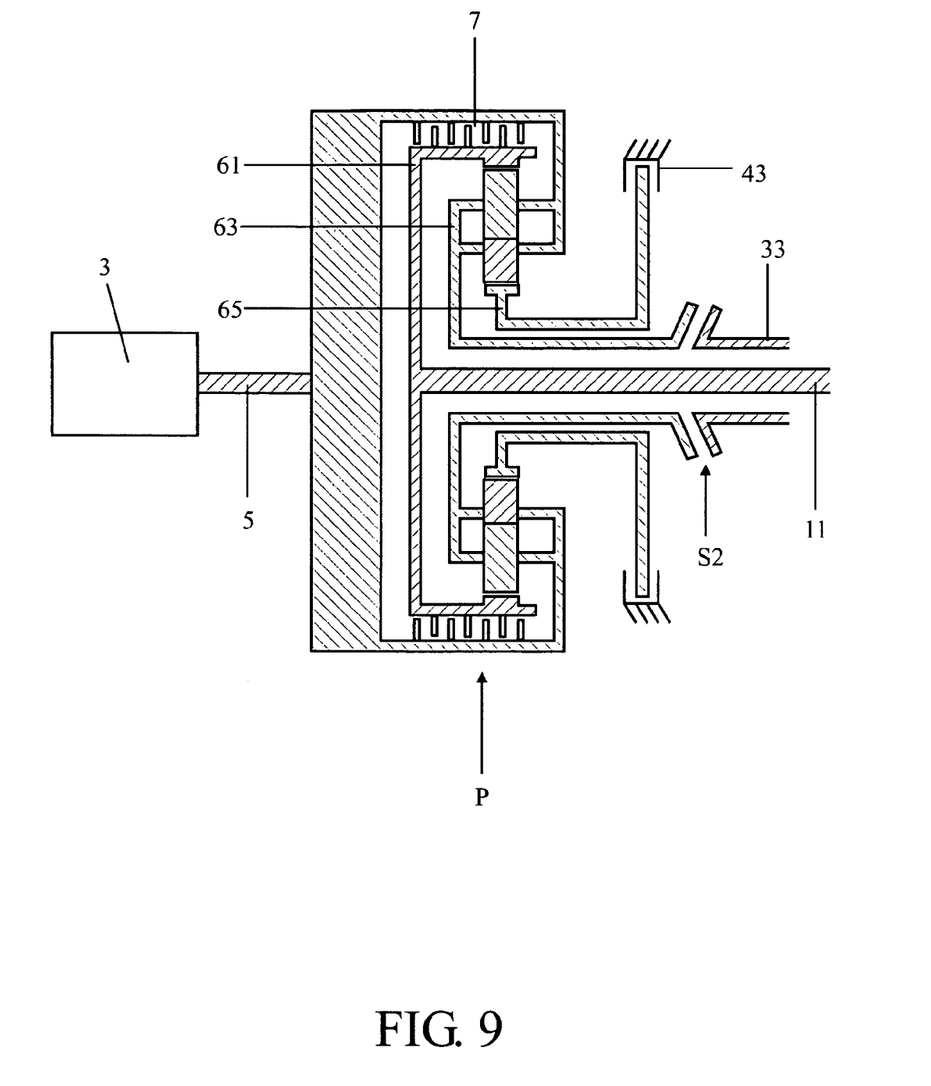
FIG. 9 shows a simplified representation of a concrete design of the clutch, the planetary gear and the further clutch of the drive shown in FIGS. 7 and 8.
Figure 10:
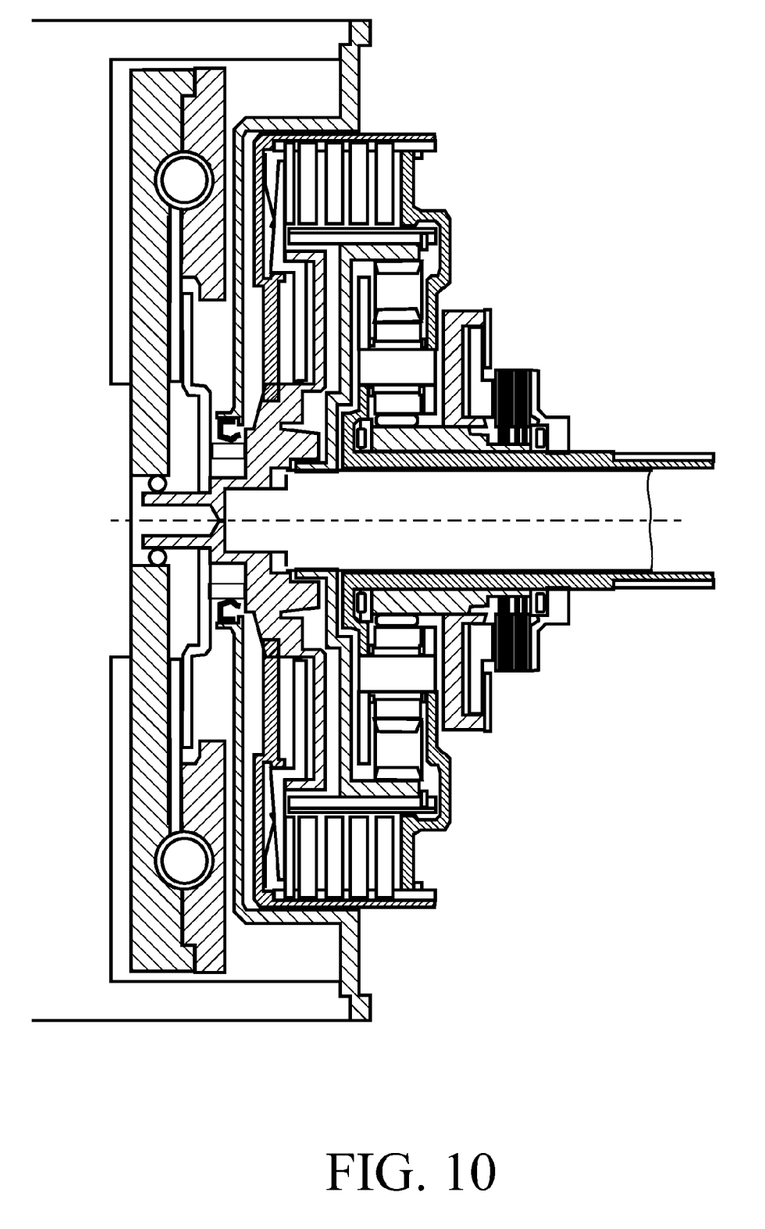
FIG. 10 shows a concrete representation of the simplified representation shown in FIG. 9.

FIGS. 9 and 10 show a concrete design of the clutch 7, the planetary gear P and the further clutch S2 of the drive shown in FIGS. 7 and 8 in simplified and concrete representation respectively. The planetary gear P has three rotation bodies, of which a first rotation body, formed by an annulus 61, is connected to the first input 11 of the transmission, a second rotation body, formed by a planet carrier 63, is connected to the crank shaft 5, and a third rotation body, formed by a sun wheel 65, can be connected via a clutch (synchromesh) or brake 43 to the fixed entities. The planet carrier 63 carries several planet wheel pairs.

Figure 11:
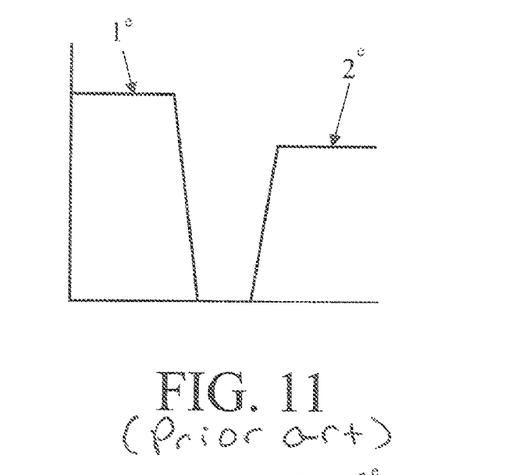
FIG. 11 shows a graph of the changes in transmission ratio with the known drive.
Figure 12:
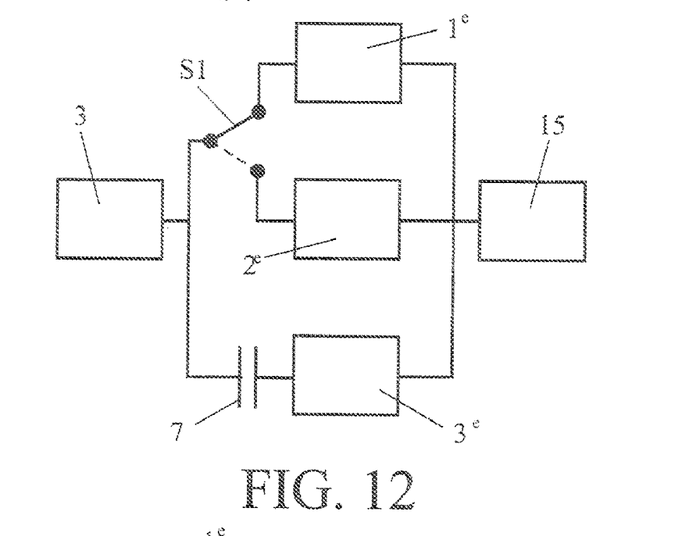
FIG. 12 shows a schematic representation of the drive according to the invention.
Figure 13:
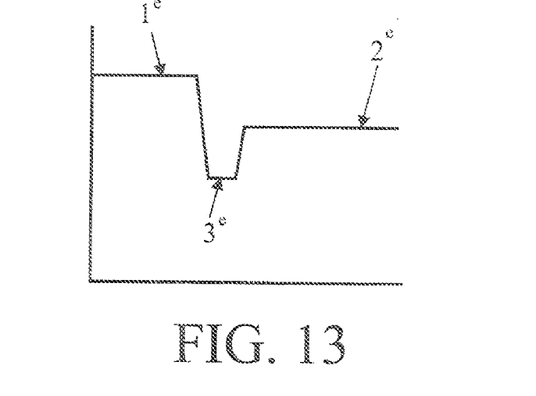
FIG. 13 shows a graph of the changes in transmission ratio with the drive according to the invention.

In the known drive the change from a first to a second transmission is made by opening the main clutch 7, see FIG. 11. In the drive according to the invention, when the transmission ratio is changed, the drive occurs via a third transmission, see FIG. 12, with a slipped main clutch 7, see FIG. 13.

Although in the above the invention is explained on the basis of the drawings, it should be noted that the invention is in no way limited to the embodiments shown in the drawings. The invention also extends to all embodiments deviating from the embodiments shown in the drawings within the context defined by the claims.

What is claimed is:

1. Drive for a vehicle, comprising: a drive source with an outgoing crank shaft, as well as a transmission with a first input that can be connected to the crank shaft and an output that can be connected to the driven wheels of a vehicle, which transmission comprises several gear clutches, as well as several gear wheel transmissions, which can be connected to each other via the gear clutches and to the input and output, which transmission also comprises a further, second input concentric to the first input, and which drive also comprises a first clutch formed by a main clutch, which is present between the crank shaft and the first input of the transmission, a second clutch formed by a further clutch, which is present between the crank shaft and the second input of the transmission, and a third clutch formed by one of the gear clutches, which third clutch is present between the first and second inputs of the transmission, characterized in that the further clutch can connect the crank shaft directly to the second input and the third clutch can connect the first input directly to the second input of the transmission, whereby the first input is formed by an input shaft and the second input is formed by a gear wheel concentric to the input shaft, which gear wheel is part of one of the gear wheel transmissions.

2. Drive according to claim 1, characterised in that the further clutch is formed by a synchromesh.

3. Drive according to claim 1, characterised in that the third clutch is formed by a synchromesh.

4. Drive according to claim 1, characterised in that the main clutch can connect the crank shaft directly to the first input of the transmission.

5. Drive according to claim 1, characterised in that the drive also comprises a planetary gear with three rotation bodies, of which a first rotation body is connected to the first input of the transmission and via the main clutch to the crank shaft, a second rotation body is connected to the crank shaft and via the further clutch to the second input of the transmission, and a third rotation body can be connected via a clutch or brake to fixed entities.

6. Drive according to claim 5, characterised in that the first rotation body is formed by an annulus, the second rotation body by a planet carrier, and the third rotation body by a sun wheel.

7. Drive according to claim 5, characterised in that the transmission can be changed between several transmission ratios and in that with the third rotation body, which is connected to the fixed entities, the transmission ratio of the planetary gear is such that the planetary gear forms a pre-reduction, which reduces the total transmission of the drive by twice the difference between the successive transmission ratios of the transmission.

8. Drive according to claim 1, characterised in that a first and second gear wheel transmission of the gear wheel transmissions of the transmission can be selectively connected by a first of the gear clutches to the first input and to a third, fourth and fifth gear wheel transmission of which the third gear wheel transmission can be connected by a second gear clutch to an intermediate shaft, and the fourth and fifth gear wheel transmission can be selectively connected by a third gear clutch to the intermediate shaft, which second gear clutch can connect the intermediate shaft to the first gear clutch instead of to the third gear wheel transmission, and which intermediate shaft can be directly connected via a fourth gear clutch to the output or via a further planetary gear that belongs to the transmission, in which the second input is connected to the first gear wheel transmission.

9. Drive according to claim 8, characterised in that the second gear clutch can connect the intermediate shaft to a part of the first gear clutch connected to the first input.

10. A drive for a lorry, the drive comprising:
a drive source with an outgoing crank shaft;
a transmission with a first input that can be connected to the crank shaft;
an output that can be connected to the driven wheels of a vehicle, which transmission comprises several gear clutches, as well as several gear wheel transmissions, which can be connected to each other via the gear clutches and to the input and output, which transmission also comprises a further, second input concentric to the first input, and which drive also comprises a first clutch formed by a main clutch, which is present between the crank shaft and the first input of the transmission, a second clutch formed by a further clutch, which is present between the crank shaft and the second input of the transmission; and a third clutch formed by one of the gear clutches, which third clutch is present between the first and second inputs of the transmission, characterized in that the further clutch can connect the crank shaft directly to the second input and the third clutch can connect the first input directly to the second input of the transmission, whereby the first input is formed by an input shaft and the second input is formed by a gear wheel concentric to the input shaft, which gear wheel is part of one of the gear wheel transmissions.

11. A method for shifting, the method comprising the steps of:

providing a drive comprising: a drive source with an outgoing crank shaft, as well as a transmission with a first input that can be connected to the crank shaft and an output that can be connected to the driven wheels of a vehicle, which transmission comprises several gear clutches, as well as several gear wheel transmissions, which can be connected to each other via the gear clutches and to the input and output, which transmission also comprises a further, second input concentric to the first input, and which drive also comprises a first clutch formed by a main clutch, which is present between the crank shaft and the first input of the transmission, a second clutch formed by a further clutch, which is present between the crank shaft and the second input of the transmission, and a third clutch formed by one of the gear clutches, which third clutch is present between the first and second inputs of the transmission, characterized in that the further clutch can connect the crank shaft directly to the second input and the third clutch can connect the first input directly to the second input of the transmission, whereby the first input is formed by an input shaft and the second input is formed by a gear wheel concentric to the input shaft, which gear wheel is part of one of the gear wheel transmissions;

slipping the main clutch when a first transmission ratio of the transmission is changed to a second transmission ratio, so that the torque transfer of the drive source to the output occurs via the further clutch; and creating a path in the transmission by putting the gear clutches into a position so that the transmission ratio of the transmission is higher than the second transmission ratio.

12. The method for shifting according to claim 11, further comprising the step of changing between two different paths with equal transmission ratios.

* * * * *